Patented Feb. 5, 1946

2,394,010

UNITED STATES PATENT OFFICE 2,394,010

STABILIZED CHLORINE-CONTAINING RESINS

Richard W. Quarles, Pittsburgh, Pa., assignor to Carbide and Carbon Chemicals Corporation, a corporation of New York No Drawing. Application September 29, 1942, Serial No. 460,126

7 Claims. (Cl. 260—42)

The subject of this invention is a plastic composition including a chlorine-containing resin which is stabilized against deterioration caused by heat.

It is well known that films deposited from coating compositions composed of chlorine-containing resins normally are susceptible to decomposition on exposure to heat. This decomposition is accompanied by the discoloration or darkening of the film, and in many instances, the elimination of hydrogen chloride has been detected. The deterioration of chlorine-containing resins is accelerated by the presence of metals, particularly the more chemically active metals, such as iron and zinc, over which protective resinous coatings are commonly employed. Consequently, chlorine-containing resins, which require baking for adequate adhesion or which otherwise will be subjected to heat, cannot be utilized alone as coatings over most metal surfaces in commercial use. The decomposition of these chlorine-containing resins is especially severe in that any hydrogen chloride released in the initial discoloration is a catalyst for further rapid deterioration of the resin.

Recognition of these facts have led to two different proposals in the art; one involves forming a protective film between the chlorine-containing resin and the metal surface, and the other involves the addition of basic materials, both organic and inorganic, to the composition for the purpose of inhibiting the release of hydrogen chloride or reacting with the hydrogen chloride released. The former proposal makes use of expedients, such as primer coatings, between the heat sensitive resin and the metal as well as pretreatment of the metal surface by the well known bonderizing or phosphatizing operations, and these expedients in themselves are not adequate. The disadvantages of the latter proposal are dual. One is that the inorganic basic materials with few exceptions are insufficiently compatible with the chlorine-containing resins so that clear compositions cannot be obtained. The other is that the organic basic materials heretofore proposed have themselves caused partial discoloration of the chlorine-containing resins, even though they tend to prevent blackening and release of hydrogen chloride. It has been found that the organic basic materials proposed by the art, whether they be monomeric nitrogen compounds, such as urea or triethanolamine, or polymeric nitrogen compounds, such as polymeric amino-alcohol esters of alpha-substituted acrylic acids, or reaction products of diphenylguanidine with formaldehyde, or of triethanolamine with polycarboxylic acids, have contained nitrogen atoms of sufficient basicity to cause discoloration of chlorine-containing resins when included therein as stabilizers. It is believed that even the less basic nitrogen compounds cause this discoloration by their tendency to actually split off hydrogen chloride from the resin and combine with it. For instance, a film of a conjoint polymer of vinyl chloride and vinyl acetate containing 2% of urea was a deep red color after baking on steel for 30 minutes at 350° F., although the film had not become black or lost its strength as do films of the unstabilized resins after being subjected to these conditions for but a few minutes.

According to this invention, a class of nitrogen-containing organic stabilizers has been developed which are capable of combining with hydrogen chloride but are not so basic as to cause films of chlorine-containing resins including such stabilizers to become discolored on baking. Furthermore, the new stabilizers are not subject to the disadvantages of water solubility and volatility which accompany many of the nitrogen-containing compounds heretofore proposed as stabilizers. The nitrogen-containing substances of this invention are compatible with chlorine-containing resins in the proportions necessary for stabilization and they have the additional advantages of chemical stability, absence of undesirable color, and less toxicity than the lead pigments commonly employed as stabilizers.

The nitrogen-containing stabilizers of this invention consist of polycarboxylic acid resinous esters of aromatic alkylolamines. More specifically, the new stabilizers comprise the class of resinous esters of tertiary aryl dialkylolamines with polycarboxylic acids. The presence of the aryl group in the alkylolamines is believed to be responsible for the nitrogen-containing stabilizers being insufficiently basic to cause discoloration of the chlorine-containing resin. The resin-forming reaction appears to proceed through the formation of ester linkages.

Aryl di-alkylolamines which have been reacted with polycarboxylic acids to form resinous stabilizers for chlorine-containing resins include phenyl diethanolamine, naphthyl diethanolamine, naphthyl diisopropanolamine, phenyl diisopropanolamine and ortho-phenyl phenyl diethanolamine. Aryl di-alkylolamines of the class described may be made by reacting aromatic amines with alkylene oxides.

Any polycarboxylic acid or its anhydride may be used to react with an aryl dialkylolamine to form a resinous ester stabilizer for chlorine-containing resins. The principle of the invention is the same irrespective of the polycarboxylic acid employed, and it is obvious that all compounds embraced within the term "polycarboxylic acid" are included within the scope of the invention irrespective of whether they are of the cyclic or acyclic series of organic polycarboxylic acids and irrespective of whether they contain two or more carboxyl groups. Within the class of cyclic polycarboxylic acids are included heterocyclic acids and carbocyclic acids, such as monocyclic, polycyclic and endocyclic acids. Within the class of acyclic polycarboxylic acids are included both straight chain and branched chain acids and both saturated and unsaturated acids. Within the class of polycarboxylic acids, representative acids have been used in the preparation of resinous ester stabilizers for chlorine-containing resins and the equivalency of the members of this class has been established. The poly-carboxylic acids which have been thus employed include phthalic acid, maleic acid, succinic acid, adipic acid, endomethylene tetrahydrophthalic acid, endomethylene hexahydrophthalic acid and a bicyclic acid formed by the reaction of a mixture of terpenes and maleic anhydride. Other examples of suitable polycarboxylic acids include malonic, glutonic, pimelic, malic, citric, aconitic, tricarballylic, itaconic, citraconic, fumaric, isosuccinic, sebacic, diglycolic, dilactic, diphenic, 1,8-naphthalic and camphoric acids, as well as the entire class of acids which may be formed by the Diels and Alder reaction of maleic anhydride with compounds containing conjugated double bonds, including hydrocarbons, such as cyclopentadiene, piperylene, isoprene and terpenes; acids, such as abietic acid, and heterocyclic compounds, such as furan. While they are not preferred, compounds such as chlorphthalic acid may be used in the practice of the invention.

A typical method of preparation of the resinous ester stabilizers is given below.

In a flask equipped with a stirrer, 271.5 parts (1.5 mols) of phenyl diethanolamine,

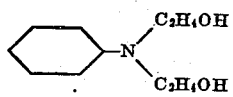

were heated with 222 parts (1.5 mols) of phthalic anhydride. The temperature was raised slowly to 170°–180° C. and the water of reaction was removed. Toward the end of the reaction, about 40 parts of a naphtha of high flash point were added to facilitate the removal of the last portion of the water and to reduce the viscosity of the mixture. The reaction was continued until 25 parts of water had been removed, and most of the naphtha distilled over in this period. The reaction product was a soft balsam-like resin which was readily soluble in the usual lacquer solvents.

It is an established fact that chlorine-containing resins do not have unlimited resistance to heat, and that they are susceptible to stabilization to inhibit the release of hydrogen chloride and to increase their resistance to thermal deterioration. Accordingly, the invention provides a class of stabilizers which are of definite assistance in increasing the thermal stability of chlorine-containing resins which are subject to deterioration by heat and which tend to become brittle, discolored, blackened, or otherwise decomposed under these conditions. Such resins include polymers of vinyl chloride; conjoint polymers of vinyl chloride with vinyl esters of aliphatic acids, with esters of acrylic and methacrylic acids, and with acrylic nitrile; after-chlorinated polymers and conjoint polymers of vinyl chloride; polymers of vinylidine chloride and conjoint polymers of vinylidine chloride with vinyl chloride and other polymerizable compounds; polymers of vinyl chloroacetate, chlorostyrene and dichlordivinyl ether; chlorinated polymers of vinyl acetate and of styrene and chlorinated polymeric esters of acrylic and alpha-substituted acrylic acids; chlorinated rubbers, such as those containing from 50% to 70% chlorine; chlorinated resinous polymers of ethylene; polymers of 2-chlorobutadiene and after-chlorinated polymers of 2-chlorobutadiene; rubber hydrochloride and chlorinated rubber hydrochloride.

The aryl dialkylolamine resinous esters of polycarboxylic acids of the class described are particularly effective stabilizers for resins containing polymerized vinyl chloride, which are extensively employed as surface coatings and in plastic compositions of all types. The new stabilizers are especially adapted for use with conjoint polymers of vinyl chloride with vinyl esters of aliphatic acids, notably acetic, when they are baked over metal surfaces to improve the adhesion. These resins may contain from 60% to 95% vinyl chloride, and their molecular weight may vary from 8000 to 22,000, or higher, depending on the type of coating which is desired. These coatings are tough, adherent, and extremely resistant to oils, water, chemicals and many of the common solvents.

The amount of stabilizer required with the chlorine-containing resins is small and amounts from 0.5% to 8% of the resin to be stabilized are preferably employed. Larger amounts of stabilizers are effective but in certain instances, they tend to cause a red color in the resin.

The flexibility and adherence of stabilized coatings comprising the chlorine-containing resins can be increased by the inclusion in the coating of small amounts of alkyd resins which do not contain nitrogen atoms. Any resin of the alkyd type, i. e., formed by reacting a polyhydric alcohol with a polycarboxylic acid can be employed. Examples of such resins include the reaction products of glycerol with phthalic anhydride and adducts of terpenes and other conjugated dienes with maleic anhydride. A number of such resins have been tested, and the commercial types may be described as castor oil modified glycerol-phthalic anhydride resins and other non-drying oil modified alkyd resins, drying oil modified alkyd resins, phenol modified alkyd resins, and unmodified alkyd resins from glycols and terpene-maleic anhydride addition products. These alkyd resins, when included in baked coatings consisting of chlorine-containing resins as the principal film-forming ingredient, also reduce the baking temperature required to effect adequate adhesion.

Tests have established that the new stabilizers are about twice as effective as the best of other nitrogen-containing resins as stabilizers for coatings of this type, and they are several times more effective than those of the inorganic base type. For instance, a film of a conjoint polymer of vinyl chloride with vinyl acetate containing 1% phenyl diethanolamine phthalate resin and 1% of a castor oil modified glycerol-phthalic anhydride resin remained practically colorless after baking for 15 minutes on a steel panel at 350° F., whereas a similar film containing 1% of the alkyd resin and 1% of a urea-formaldehyde-alcohol resin was badly discolored after a similar bake. In order to obtain equivalent heat stabilities employing the urea-formaldehyde resin stabilizers, approximately twice as much stabilizer must be used as is required with the stabilizing resins of this invention.

In still other tests, the new aryl dialkylolamine resinous esters with polycarboxylic acids were compared with two stabilizers of the inorganic type which have good stabilizing qualities, namely, dibutyl tin acetate and sublimed blue lead pigment. The stabilizer representative of this invention was the adipic acid resinous ester of ortho-phenyl phenyl diethanolamine

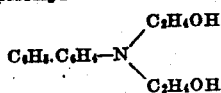

Lacquers having a base of a conjoint polymer of vinyl chloride with vinyl acetate containing the three stabilizers in varying amount were prepared and films approximately 0.0010 inch thick were applied to clean steel panels by dipping. After drying, the panels were baked in an oven under identical conditions at 325° F. The appearance of each film after different times of baking is given below, on a scale in which 10 represents a colorless film, 5 represents a dark film with first traces of black and 0 represents a black, completely charred film. Intermediate numbers represent intermediate gradations in color.

Condition of film after baking at 325° F.

| | Test No. | | | | | | |
|---|---|---|---|---|---|---|---|
| | 1 | 2 | 3 | 4 | 5 | 6 | 7 |
| Stabilizer, per cent | None | | | | | | |
| Ortho-phenyl phenyl diethanolamine adipate resin | | 1 | 2 | | | | |
| Dibutyl tin diacetate | | | | 1 | | | |
| Sublimed blue lead | | | | | 1 | 2 | 4 |
| Time of bake, minutes: | | | | | | | |
| 5 | 10 | 10 | 10 | 10 | 10 | 10 | 10 |
| 10 | 5 | 10 | 10 | 10 | 5 | 5 | 6 |
| 15 | 1 | 9 | 9 | 10 | 1 | 2 | 4 |
| 20 | 0 | 9 | 9 | 5 | 0 | 0 | 2 |
| 25 | 0 | 8 | 8 | 1 | 0 | 0 | 1 |
| 30 | 0 | 8 | 8 | 0 | 0 | 0 | 0 |
| 40 | 0 | 6 | 7 | 0 | 0 | 0 | 0 |
| 50 | 0 | 5 | 7 | 0 | 0 | 0 | 0 |

The following examples are intended to illustrate the principle of the invention.

Example 1

A white pigmented lacquer of the following composition was prepared:

| | Per cent |
|---|---|
| Titanium dioxide | 12.500 |
| Conjoint polymer vinyl chloride-vinyl acetate, vinyl chloride content about 87%, average molecular weight about 9000 | 17.200 |
| Phenyl diethanolamine phthalate resin stabilizer | 0.125 |
| Maleic acid-terpene adduct-glycerol alkyd resin | 0.085 |
| Di(beta-butoxyethyl) phthalate | 3.17 |
| Methyl isobutyl ketone | 33.46 |
| Toluene | 33.46 |
| Total | 100.00 |

This lacquer was applied without a primer coating to a steel panel and basked for 30 minutes at 325° F. A perfectly white and adherent coating was obtained which showed no decomposition or weakness in film strength, and which had no decreased resistance to water, oils, acids and alkalies. This coating schedule is a distinct advance in the art, since heretofore stabilizing lead pigments have been advocated for use in baked pigmented coatings containing this resin applied directly to metal without a stabilizing primer. Since most of these stabilizing pigments are too dark in color to be masked by other pigments, the colors heretofore obtainable with one coat finishes were definitely limited.

Example 2

A film of a conjoint polymer of vinyl chloride with vinyl acetate containing 0.75% of a resin prepared from phenyl diethanolamine and 3,6-endomethylene hexahydrophthalic anhydride when heated on steel for 20 minutes at 300° F. remained clear and colorless.

Example 3

A film of polyvinyl chloride on steel containing 1% of a resin prepared from phenyldiethanolamine and 3,6-endomethylene hexahydrophthalic anhydride remained practically colorless on heating for 20 minutes at 300° F. Without the stabilizer, the resin film was completely blackened upon heating under similar conditions.

Example 4

A film of chlorinated rubber of 20 centipoises. viscosity when baked on steel for 10 minutes at 315° F., showed very bad discoloration and blackening. The discoloration was much less severe and the film strength was unimpaired when 1% of the resin stabilizer described in Examples 2 and 3 was incorporated in the chlorinated rubber.

The following examples present in tabular form the diverse number and form of stabilizing resins which are useful in the practice of this invention. The resins were prepared by refluxing the ingredients, usually in the presence of a diluent, until the desired degree of resinification occurred. The reaction was stopped while the resins remained soluble in the usual lacquer thinners.

| Example number | Aryl alkylolamine | Dibasic acid | Mols of amine | Mols of acid | Mols water removed |
|---|---|---|---|---|---|
| 5 | Phenyl diethanolamine | Maleic anhydride | 1 | 1 | 0.72 |
| 6 | do | Endo-methylene hexahydrophthalic anhydride | 1.5 | 1.5 | 1.5 |
| 7 | Alpha-naphthyldiisopropanolamine | Phthalic anhydride | 0.75 | 0.75 | 0.7 |
| 8 | Phenyl diisopropanolamine | do | 0.33 | 0.33 | 0.3 |
| 9 | do | Succinic acid | 0.91 | 0.91 | 1.8 |
| 10 | do | Maleic anhydride, ¼ phthalic anhydride, ¾. | 0.97 | 0.97 | 1.1 |
| 11 | Phenyl diethanolamine | Terpene-maleic anhydride adduct | 0.5 | 0.43 | 0.3 |
| 12 | do | Di(carboxymethyl) phenylamine | 1 | 1 | 0.9 |
| 13 | O-phenyl phenyl diethanolamine | Phthalic anhydride | 0.5 | 0.5 | 0.5 |
| 14 | do | Adipic acid | 0.5 | 0.5 | 1.0 |

The above resins were tested as heat stabilizers for films of a conjoint polymer of vinyl chloride with vinyl acetate when baked on steel. All had significant stabilizing qualities, although the maleate and succinate resins appeared better on an equal weight basis because of their higher nitrogen content. On the other hand, the adipate and phthalate resins are more water resistant than the succinate resins. The maleate resins are difficult to prepare because of the tendency for cross-linking and consequent insolubilization of the resin to occur, but this is a favorable property on baking the stabilized chlorine-containing resins, as the films become more resistant to moisture and chemicals because of the insolubilization of the maleate resin which occurs. The resins prepared from the long chain dibasic acids, such as adipic, are softer than the succinate or phthalate resins, and thus they are somewhat easier to disperse in the chlorine-containing resins to be stabilized.

It is obvious that many resinous esters of aryl dialkylolamines and polycarboxylic acids other than are shown in the foregoing examples may be prepared, and the invention as herein described and claimed is applicable to all such compounds as stabilizers for chlorine-containing resins which are subject to deterioration on exposure to heat.

I claim:

1. A coating composition containing a chlorine-containing resin normally subject to deterioration on heating and, as an inhibitor of such deterioration, a ketone-soluble resinous ester of a dicarboxylic acid and an aryl tertiary dialkylolamine having from two to three carbon atoms in each alkylol radical.

2. A coating composition containing a chlorine-containing resin normally subject to deterioration on heating and, as an inhibitor of such deterioration, a ketone-soluble resinous ester of an aryl diethanolamine and a dicarboxylic acid.

3. A coating composition containing a chlorine-containing resin normally subject to deterioration on heating and, as an inhibitor of such deterioration, a ketone-soluble resinous ester of an aryl diisopropanolamine and a dicarboxylic acid.

4. A coating composition containing a chlorine-containing resin normally subject to deterioration on heating and, as an inhibitor of such deterioration, a ketone-soluble resinous ester of ortho-phenyl phenyl diethanolamine and adipic acid.

5. A stabilized coating composition containing a conjoint polymer of vinyl chloride with vinyl acetate and as a stabilizer therefor, a resinous ester of an aryl diethanolamine and a dicarboxylic acid.

6. A stabilized coating composition containing a conjoint polymer of vinyl chloride with vinyl acetate and, as a stabilizer therefor, from 0.5 to 8% by weight of the conjoint polymer of a ketone-soluble resinous ester of ortho-phenyl phenyl diethanolamine and adipic acid.

7. A stabilized coating composition containing a conjoint polymer of vinyl chloride with vinyl acetate and as a stabilizer therefor, a resinous ester of an aryl diisopropanolamine and a dicarboxylic acid.

RICHARD W. QUARLES.